United States Patent [19]

Kato

[11] 4,114,866

[45] Sep. 19, 1978

[54] GAS FILLING ARRANGEMENT FOR A TELESCOPIC SUSPENSION UNIT

[75] Inventor: Tetuo Kato, Yokohama, Japan

[73] Assignee: Tokico Ltd., Kawasaki, Japan

[21] Appl. No.: 805,575

[22] Filed: Jun. 10, 1977

[30] Foreign Application Priority Data

Jun. 19, 1976 [JP] Japan .................................. 51-72511

[51] Int. Cl.² .............................................. F16F 9/43
[52] U.S. Cl. ...................................... 267/64 R; 141/4; 188/322; 188/352
[58] Field of Search ................. 267/64 R, 64 H, 64 B, 267/65 R, 129; 188/322, 352; 220/86 R; 222/402.16; 141/3, 4, 20; 53/7, 8, 88

[56] References Cited

U.S. PATENT DOCUMENTS

| 2,729,381 | 1/1956 | Wiser ........................................ 141/4 |
| 3,139,159 | 6/1964 | Lob ..................................... 267/64 R |
| 3,441,177 | 4/1969 | Treharue ......................... 222/402.16 |
| 3,651,997 | 3/1972 | Venus .............................. 222/402.16 |
| 3,957,259 | 5/1976 | Peddinghaus ..................... 267/64 R |

FOREIGN PATENT DOCUMENTS

| 690,273 | 7/1964 | Canada ..................................... 141/20 |
| 678,804 | 9/1952 | United Kingdom ..................... 188/322 |

*Primary Examiner*—Edward R. Kazenske

[57] ABSTRACT

A cylindrical container with a rod slidably projecting from one end thereof such as a hydropneumatic shock absorber or a gas spring, in which a seal member through which the rod extends in sliding sealing engagement is normally urged by a spring against the inner surface of one end of the container and is adapted to move inwardly against the spring force of the spring to form a gas filling passage along the inner surface of the container when a pressing force is applied on the seal member from outside of the container.

5 Claims, 2 Drawing Figures

GAS FILLING ARRANGEMENT FOR A TELESCOPIC SUSPENSION UNIT

BACKGROUND OF THE INVENTION

This invention relates to pressurizing of a closed-type container and more particularly to technique for injecting gas under pressure into a closed-type cylinder having a piston rod slidably and sealingly projecting through one end of the cylinder such as a hydropneumatic shock adsorber or a gas spring.

It is known to pressurize a closed-type cylinder such as a hydropneumatic shock absorber by forming a small hole or an orifice in the wall of the cylinder, supplying gas under pressure to the interior of the cylinder through the orifice, and closing the orifice permanently by welding or the like with or without utilizing a closure member such as a plug inserted into the orifice, as shown in, for example, British patent specification No. 996,356 and U.S. Pat. No. 3,081,587. But such prior art methods have shortcomings; for example it is troublesome and expensive to form the gas filling orifice in the wall of the cylinder and to plug the orifice and to perform a welding operation around the periphery of the plug to assure sealing of the cylinder, and the welding equipment for such an operation is complicated. Further, it is impossible to adjust the gas pressure after the gas filling and sealing operation has been performed.

According to another prior art method for filling a closed-type cylinder such as a hydropneumatic shock absorber with gas, there is provided a seal member between a cap member closing one end of the cylinder and either a rod projecting from the cylinder or the inner wall of the cylinder in sliding sealing engagement, and the seal member is adapted to deform or displaced inwardly so as to form a passage therearound, so that high pressure gas applied on the outside of said one end of the cylinder can enter the cylinder. But since the seal member displaces or deforms according to the differential pressure generated across the seal member, it has been difficult to obtain the desired pressure in the cylinder.

SUMMARY OF THE INVENTION

An object of the present invention is to overcome the shortcomings described above by providing a seal member sealingly closing one end of a closed-type container, and a spring urging the seal member against the internal surface of said one end of the container. For filling the container with gas, the seal member is displaced inwardly against the spring force of the spring to form a gas filling passage between the internal surface of the container and the seal member by pressing on the seal member from outside of the container. When the cylinder has been filled with gas, the pressing force applied on the seal member is removed and the seal member moves to its original position. Thus, the gas pressure in the container can be adjusted accurately as desired.

BRIEF DESCRIPTION OF THE DRAWINGS

Further objects and effects of the present invention will be described in conjunction with accompanying drawings exemplifying a preferred embodiment of the present invention in which.

DETAILED DESCRIPTION OF THE PREFERRED EMBODIMENTS

Figure 1:
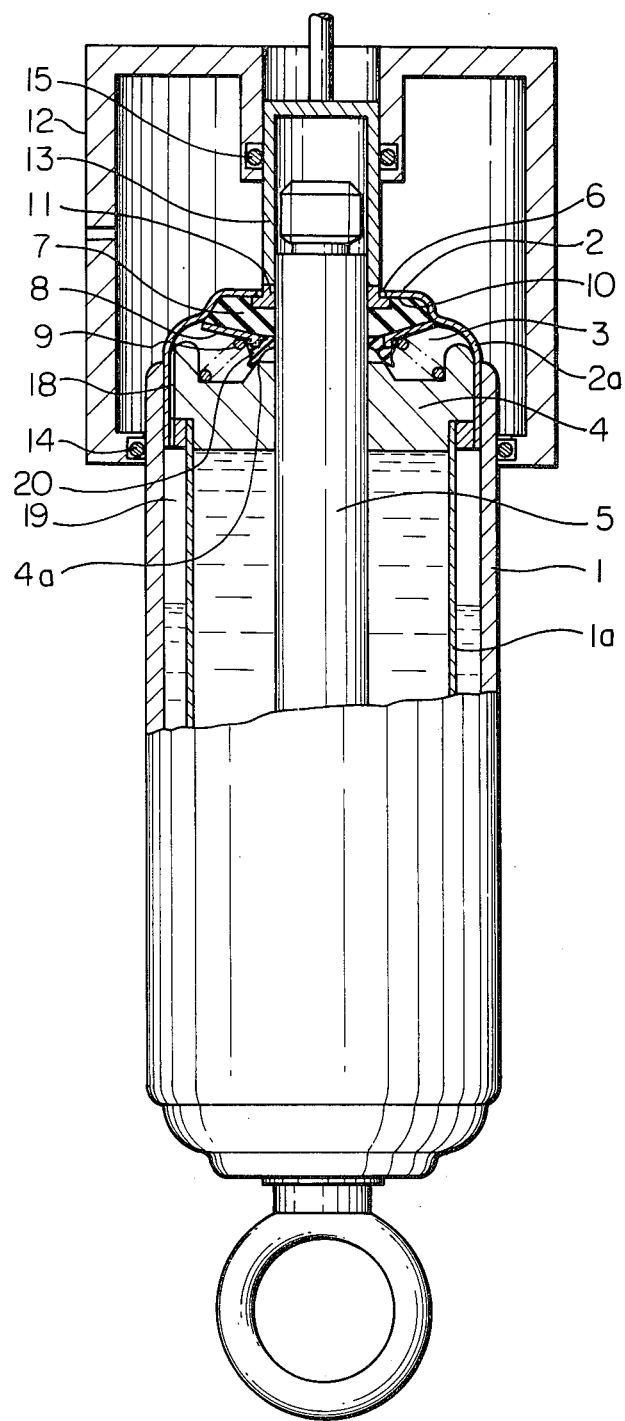
FIG. 1 is a partial cross-sectional side view of a hydropneumatic shock absorber according to the present invention with a gas filling device attached thereto.

Shown at 1 in the drawings is a cylindrical container with a cap member 2a secured to the upper end portion 2 of the container. A rod guide 4 is disposed in the container 1 with a predetermined space 3 defined between the rod guide 4 and the end portion 2. An inner cylinder 1a is secured in the container 1. A piston rod 5 extends slidably through the rod guide 4 and through an opening 6 formed in the cap member 2a. A piston (not shown) having a resisting force generating mechanism therein is secured to the inner or lower end of the piston rod 5. An annular seal member 7 is positioned so as to close the opening 6 and surrounds the piston rod 5 and is in sliding sealing engagement therewith. An annular retaining ring 8 having an annular seal member 20 secured thereto receives the spring 9 force of a spring and abuts the seal member 7 to urge the seal member 7 against the internal surface 10 of the cap member 2a. The annular seal member 20 engages a shoulder 4a formed on the rod guide 20 and acts as a check valve preventing flow of gas or oil from the upper portion (gas chamber 19) the annular space between the inner and outer cylinders 1 and 1a into the interior of the inner cylinder 1a (through a passage 18, the space 3, and through a small clearance between the rod 5 and the rod guide 4) but allows flow of gas or oil in the opposite direction. A washer 11 preferably having an L-shaped cross-section is disposed adjacent to the opening 6 in the cap member 2a and between the seal member 7 and the cap member 2a. Preferably, the washer 11 is secured to the seal member 7.

For filling the hydropneumatic shock absorber having the aforesaid construction with gas, the upper end portion 2 of the container 1 is fitted into a gas filling vessel 12. The gas filling vessel 12 has a pressing tool 13 slidably mounted on the vessel 12. The pressing tool 13 is slidable along the outer surface of the piston rod 5 and is adapted to extend into the opening 6 of the container 1 with a clearance being left therebetween. Shown at 14 and 15 are seal rings disposed respectively between the container 1 and the gas filling vessel 12 and between the gas filling vessel 12 and the pressing tool 13.

Figure 2:
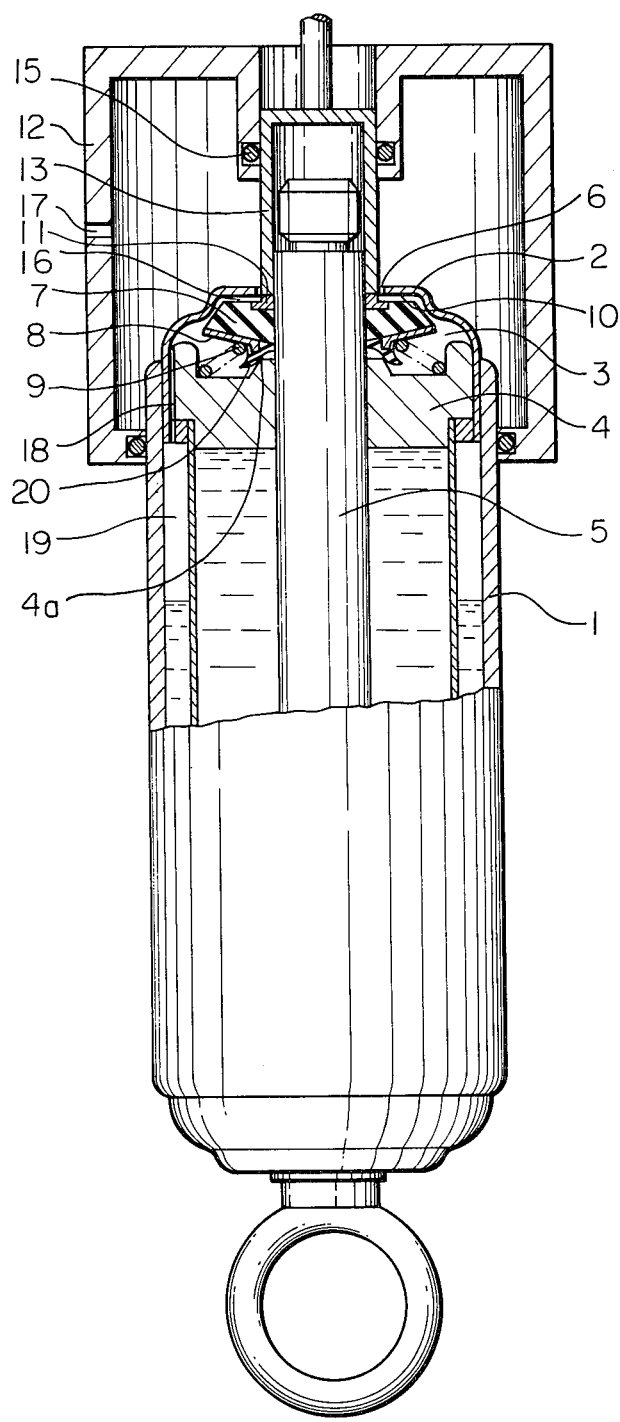
FIG. 2 is a view similar to FIG. 1 but showing the positions of the parts during a gas filling operation.

When the pressing tool 13 is moved downwardly as shown in FIG. 2, the seal member 7 is displaced into the container 1 against the spring force of the spring 7, and a passage 16 is formed between the inner surface 10 of the cap member 2a of the container 1 and the seal member 7. A gas under a predetermined pressure is introduced into the vessel 12 through an inlet 17 in gas filling vessel 12. The gas is caused to flow into the container 1 through the clearance between the pressing tool 13 and the opening 6 of the container 1 and through the passage 16. The gas chamber 19 of the hydropneumatic shock absorber is in the upper portion of annular space between the inner cylinder 1a and the inner wall of the cylindrical container 1 and communicates permanently with the space 3 in the upper portion of the container 1 through a passage 18 formed in the rod guide 4, whereby the gas under the predetermined pressure introduced into the container 1 will fill the gas chamber 19 without any substantial restriction on its flow. Therefore, pressure of the gas in the vessel 12 indicates accurately the pressure of gas being caused to flow into the container 1. When gas under a desired pressure has been caused to flow into the container 1, the pressing tool 13 is moved upwardly so that the seal member 7 will move upwardly to engage with the inner surface 10 of the cap member 2a of the container 1 by the spring force of the spring 9 thereby closing the passage 16. Alternately, the rod 5 may be moved upwardly a small amount so as to carry the seal member 7 therealong to close the passage 16. Thereafter, pressure in the vessel 12 is released and the container 1 is removed from the vessel 2. Thus, a gas at a desired pressure is enclosed in the container 1.

The embodiment shown in the drawings is a dual tube type hydropneumatic shock absorber, but the present invention may be applied to any closed type cylindrical container such as a single tube type hydropneumatic shock absorber, hydropneumatic shock absorbers of other types, or gas springs, provided that a rod projects through an opening formed in one end of the cylindrical container in sliding sealing engagement therewith and a seal member is disposed inside of the opening.

In the embodimeent shown, washer 11 is disposed inside of the opening 6 for preventing the seal member 7 from bulging out of the opening 6 and enabling smooth inward movement of the seal member 7 when a pressing force is exerted on the pressing tool 13, but the washer 11 may be omitted.

As described hereinbefore in detail the present invention provides a cylindrical container having a seal member, which is urged normally by a spring against the inner end of the container in sealingly engagement and is adapted to be displaced inwardly to form a gas filling passage when the seal member is pressed inwardly, whereby, gas under pressure can be freely introduced into the container through the gas filling passage. Therefore, the container can be filled by gas at any desired pressure by establishing an atmosphere of the gas surrounding the container and having the desired pressure. And the pressure can be adjusted very easily and accurately.

Further, a gas filling orifice, which has heretofore been formed in the container can be omitted and the welding operation for welding the orifice closed can also be omitted. Thus, the manufacturing process can be simplified and manufacturing costs can be reduced.

Further, the gas filling passage 16 can be formed by pressing the washer 11 and the seal member 7 from the outside the container, so that it is very easy to add gas to or discharge gas from the container 1 after the container has been filled with gas. Thus, it is very easy to adjust the pressure of the gas enclosed in the container or to refill container with gas.

What is claimed is:

1. A telescopic suspension unit comprising a cylindrical container for containing a fluid under pressure, a rod projecting from the upper end thereof, a seal member normally abutting against the inner surface of the upper end of the container and in sealing and sliding engagement around said rod, a spring directly engaging the seal member for urging the seal member against said inner surface of the upper end of the container, the upper end of the container having an opening therein through which said rod extends and having a size for leaving a clearance around the periphery of said rod for allowing insertion of a pressing tool between the periphery of said rod and the edge of said opening for displacing the seal member downwardly against the spring force of the spring to move it away from the upper end of said container to form a gas filling passage between said inner surface of the upper end of the container and the upper surface of the seal member, and a washer attached to the upper surface of the seal member around said rod for transmitting the force of the pressing tool to the seal member.

2. A cylindrical container as claimed in claim 1 wherein the washer is secured integrally to the seal mmember.

3. A cylindrical container as claimed in claim 1 wherein said container has a rod guide therein through which the rod extends in sliding engagement, said rod guide being spaced from the lower surface of the seal member to define a space between the seal member and the upper surface of the rod guide.

4. A cylindrical container as claimed in claim 3 wherein said spring is disposed in said space and supported on said rod guide.

5. A telescopic suspension unit comprising a cylindrical container for containing a fluid under pressure, an inner cylinder therein defining an annular chamber between the container and the inner cylinder, a rod guide closing the upper end of said inner cylinder and having a passage therethrough opening into said annular chamber, a rod extending in sliding engagement through said rod guide and extending out of the upper end of said container, a seal member normally abutting against the inner surface of the upper end of the container and in sealing and sliding engagement around said rod, said rod guide being spaced from said seal member to define a space between said seal member and said rod guide, a spring in said space and directly engaging said seal member and being supported on said rod guide for urging the seal member against the inner surface of the upper end of the container, the upper end of the container having an opening therein through which said rod extends and having a size for leaving a clearance around the periphery of said rod for allowing insertion of a pressing tool between the periphery of said rod and the edge of said opening for displacing the seal member downwardly against the force of the spring to move the seal member away from the upper end of the container to form a gas filling passage between said inner surface of the upper end of the container and the upper surface of the seal memmber, said rod guide having an upwardly and outwardly facing shoulder thereon around said rod, and a further annular seal member around said rod and abutting said shoulder for movement away from said shoulder when fluid under pressure passes along said rod through the rod guide from within said inner cylinder and for being pressed against said shoulder when fluid under pressure is in said space between said rod guide and said first-mentioned seal member.

* * * * *